(12) United States Patent
Shenker et al.

(10) Patent No.: US 8,820,627 B2
(45) Date of Patent: Sep. 2, 2014

(54) CONTACTLESS TEST SYSTEM

(75) Inventors: Gavin Shenker, Los Angeles, CA (US); Carl Smith, Union City, CA (US)

(73) Assignee: Visa International Service Association, San Francisco, CA (US)

( * ) Notice: Subject to any disclaimer, the term of this patent is extended or adjusted under 35 U.S.C. 154(b) by 257 days.

(21) Appl. No.: 13/445,720

(22) Filed: Apr. 12, 2012

(65) Prior Publication Data

US 2013/0098984 A1    Apr. 25, 2013

Related U.S. Application Data

(60) Provisional application No. 61/474,706, filed on Apr. 12, 2011.

(51) Int. Cl.
| | | |
|---|---|---|
| *G06F 17/00* | (2006.01) | |
| *G06K 7/01* | (2006.01) | |
| *H04W 8/20* | (2009.01) | |

(52) U.S. Cl.
CPC .. *G06K 7/01* (2013.01); *H04W 8/20* (2013.01)
USPC .......................................... 235/375; 235/492

(58) Field of Classification Search
USPC .................................. 235/375, 487, 492, 380
See application file for complete search history.

(56) References Cited

U.S. PATENT DOCUMENTS

| | | | |
|---|---|---|---|
| 8,113,435 B2 * | 2/2012 | Busch-Sorensen | 235/492 |
| 8,619,735 B2 * | 12/2013 | Montemurro et al. | 370/338 |
| 2002/0198849 A1 | 12/2002 | Piikivi | |
| 2009/0294526 A1 | 12/2009 | Maw | |
| 2010/0187308 A1 * | 7/2010 | Busch-Sorensen | 235/439 |

OTHER PUBLICATIONS

International Search Report and Written Opinion mailed Oct. 31, 2012, PCT/US2012/033374, 9 pages.

* cited by examiner

*Primary Examiner* — Daniel St Cyr
(74) *Attorney, Agent, or Firm* — Kilpatrick Townsend & Stockton LLP

(57) ABSTRACT

In some embodiments, a first apparatus may be provided that may comprise a processor and a storage medium coupled to the processor. The storage medium comprises code executable by the processor for performing a first method. The first method may include the step of receiving data comprising a plurality of profiles. Each of the profiles may be associated with a contactless transaction device. The first method may further comprise the steps of communicating with a test contactless transaction device using short range wireless communication, and using the plurality of profiles to emulate each of the contactless transaction devices associated with each of the profiles in a simulated transaction with the test financial transaction device.

20 Claims, 8 Drawing Sheets

CONTACTLESS TEST SYSTEM

CROSS-REFERENCES TO RELATED APPLICATIONS

This application claims benefit under 35 U.S.C. §119(e) of U.S. provisional patent application No. 61/474,706, filed on Apr. 12, 2011, the entire disclosure of which is incorporated herein by reference for all purposes.

BACKGROUND

Currently, contactless tests, such as tests conducted for new financial transaction devices, are typically performed by using a batch of sample contactless user devices (such as portable consumer devices or identification cards) with a contactless acceptance devices (such as an access device). For example, in the context of testing new financial transaction devices, test payment cards are sent to acquirers or merchants so that they can test the payment cards with new access devices (such as a new POS terminal). Similar testing is performed for testing a new contactless user device by using a plurality of contactless acceptance devices. This process tends to be cumbersome, and it is difficult to receive feedback of the test results because they are performed manually.

BRIEF SUMMARY

Systems, methods, and apparatus are provided herein that may be used in a contactless test system for testing components of a contactless transaction. An emulation device (such as a handheld device—e.g. a mobile phone) may utilize a plurality of profiles corresponding to different contactless user devices or contactless acceptance devices in a plurality of simulated transactions to determine whether a new or existing device performs at an acceptable level. That is, for example, the profiles may enable the emulation device to conduct a transaction (or a simulated transaction) as though it were a plurality of contactless user devices or access devices each having different properties (such as different security features, authorization, data format and transmission protocols, etc.). In this manner, embodiments may utilize an emulation device to determine whether a contactless acceptance device is compatible with one or more contactless user devices (and thereby functions properly when interfacing with such contactless user devices), and/or whether a contactless user device is compatible with one or more contactless acceptance devices.

In some embodiments, a first apparatus may be provided. The first apparatus may comprise a processor and a storage medium coupled to the processor. The storage medium comprises code executable by the processor for performing a first method. The first method may include the step of receiving data comprising a plurality of profiles. Each of the profiles may be associated with a contactless transaction device. The first method may further comprise the steps of communicating with a test contactless transaction device using short range wireless communication, and using the plurality of profiles to emulate each of the contactless transaction devices associated with each of the profiles in a simulated transaction with the test financial transaction device.

In some embodiments, in the first apparatus as described above, the contactless transaction may comprise a financial transaction. In some embodiments, in the first apparatus as described above, the contactless transaction may comprise a security access request, coupon application, an identification determination, an admission request (such as request for access to a sporting event or mass transit fare application), an account identification, or an electronic lock system.

In some embodiments, in the first apparatus described above, the first method may further comprise the steps of receiving an indication for each simulation as to whether the simulated transaction was successful and transmitting the received indication related to the transaction to a server computer. In some embodiments, the indication may comprise information related to an error for a transaction that fails.

In some embodiments, in the first apparatus as described above, the plurality of profiles may comprise contactless user device profiles and the test contactless transaction device may comprise a contactless acceptance device. In some embodiments, the contactless user device profiles may comprise portable consumer device profiles, and the contactless acceptance device may comprise an access device. In some embodiments, the access device may comprise any one of: a proximity coupling device reader; a proximity coupling device integrated; and a proximity coupling device with application. In some embodiments, the access device may comprise a proximity coupling device reader coupled to any one of, or some combination of a terminal, a POS device, an EPOS device, an ATM, a personal computer, and a mobile phone.

In some embodiments, in the first apparatus described above, the plurality of profiles may comprise contactless acceptance device profiles, and the test contactless transaction device may comprise a contactless user device. In some embodiments, the contactless acceptance device profiles comprise access device profiles, and the contactless user device may comprise a portable consumer device.

In some embodiments, in the first apparatus described above, the step of communicating using short range wireless communication comprises any one of, or some combination of: radio frequency identification (RFID); Bluetooth™; or infra-red technology. In some embodiments, short range wireless communication comprises communications at a range of less than 5 meters. Preferably, the short range communications comprise communications at a range of less that 1 meter. More preferably, the short range communications comprise communications at a range of less than 10 centimeters. More preferably, the short range communications comprise communications at a range of less than 2.54 centimeters.

In some embodiments, the first apparatus as described above may comprise a handheld portable device. In some embodiments, the handheld portable device may comprise a mobile phone. In some embodiments, the handheld portable consumer device may comprise additional data corresponding to personal information of a user in addition to the plurality of profiles.

In some embodiments, in the first apparatus as described above, the first method may further comprise the steps of: (a) after using one of the profiles to emulate one of the contactless transaction devices associated with the one profile in a simulated transaction with the test contactless transaction device, automatically determining whether any of the other profiles are to be used in a simulated transaction with the test contactless transaction device; (b) using at least one of the determined profiles in a simulated transaction with the test contactless transaction device; and (c) repeating steps (a) and (b) until it is determined that there are no other profiles to be used in a simulated transaction with the test contactless device.

In some embodiments, in the first device as described above, each of the profiles may comprise any one of, or some combination of: a verification capability, a data authentication capability; variable transaction specific data or parameters (e.g. a low payment feature capability); encryption logic; and an authorization capability.

In some embodiments, a first method may be provided. The first method may comprise the steps of (a) receiving, at a computer apparatus, data comprising a plurality of profiles, each of the plurality of profiles associated with a contactless transaction device; (b) communicating, by the computer apparatus using short range wireless communication, with a test contactless transaction device; (c) using, by the computer apparatus, a profile of the plurality of profiles to emulate a contactless transaction device associated with the profile in a simulated transaction with the test contactless transaction device; and (d) storing, at the computer apparatus, data indicating whether the simulated transaction was successful.

In some embodiments, in the first method as described above, the method may further comprise the steps of: (e) after using the profile in the simulated transaction, determining whether any of the other profiles are to be used in a subsequent simulated transaction with the test contactless transaction device; (f) if at least one profile is determined to be used in a subsequent simulated transaction, using the at least one determined profile in a subsequent simulated transaction with the test contactless transaction device; (g) storing, at the computer apparatus, data indicating whether the subsequent simulated transaction was successful; (h) repeating steps (e) and (f) until it is determined that there are no other profiles to be used in a simulated transaction with the test contactless device; and (i) transmitting the stored data to a server computer.

In some embodiments, a server computer may be provided. The server computer may comprise a processor and a storage medium coupled to the processor. The storage medium may comprise code executable by the processor for performing a first method. The first method may include the steps of transmitting data comprising a plurality of profiles to an emulation device, where each of the plurality of profiles is associated with a contactless transaction device. The first method may further comprise receiving an indication as to whether a transaction involving the emulation device using the data comprising each of the profiles was successful and analyzing the received indication to determine if a test contactless transaction device is approved.

In some embodiments, in the server computer as described above, the first method may further include the steps of: receiving update data comprising information corresponding to a new or revised profile; storing the update data at the server computer; and automatically transmitting the update data to the first apparatus.

Some embodiments provided herein may utilize an apparatus that is capable of emulating contactless transaction devices (such as financial transaction devices) when simulating or conducting a contactless transaction. In some embodiments, the simulated transactions may be performed as part of a test of a new contactless transaction device to determine if it is properly configured to successfully conduct contactless transactions with each of the devices that are emulated. Although embodiments described herein may relate to contactless interfaces (e.g. devices that communicate using short range wireless communications), it should be appreciated that some of the concepts described herein may be equally applicable to contact transactions and related devices (such as devices that may utilize a magnetic strip and swipe methods).

For example, in some embodiments an emulation device may be used to test a new contactless acceptance device (such as a POS terminal used in financial transactions) to ensure that it is capable of handling (e.g. is compatible with) different types of contactless user devices (e.g. portable consumer devices such as smart cards). In some embodiments, the emulation device may comprise a handheld portable device such as a mobile phone, which may have short range communication capabilities (such as near-field communication capabilities). Using an example of a financial transaction, profiles of different portable consumer devices (e.g. information corresponding to the configuration of each portable consumer device, how the portable device provides information in a transaction, the type of information provided by the portable consumer device, encryption techniques, etc.) may then be loaded onto the emulation device. The emulation device may then be used to simulate one or more transactions with a new (or test) access device (e.g. a test contactless transaction device) using each of the stored profiles to determine if the new access device is capable of successfully conducting transactions with each of the different types of portable consumer devices. In this way, a single device (the emulation device) may be utilized to test the compatibility of a new contactless acceptance device (e.g. an access device for financial transactions) with many different types of contactless user devices (e.g. portable consumer devices for financial transactions).

In some embodiments, rather than a new (or test) contactless acceptance device (such as an access device), it may be desirable to determine the compatibility of a new contactless user device (such as a portable consumer device) with existing contactless acceptance devices. In some such embodiments, the emulation device may have one or more profiles corresponding to different contactless acceptance devices (and each of their associated configuration information), which the emulation device may then use to emulate those devices in simulated transactions with the new (or test) user contactless device. In some embodiments, the data about each simulated transaction, including error messages, may be stored and/or transmitted to a central server by the emulation device.

BRIEF DESCRIPTION OF THE DRAWINGS

FIG. 2(a) shows an exemplary user contactless device in the form of a portable consumer device.

DETAILED DESCRIPTION

Figure 1:
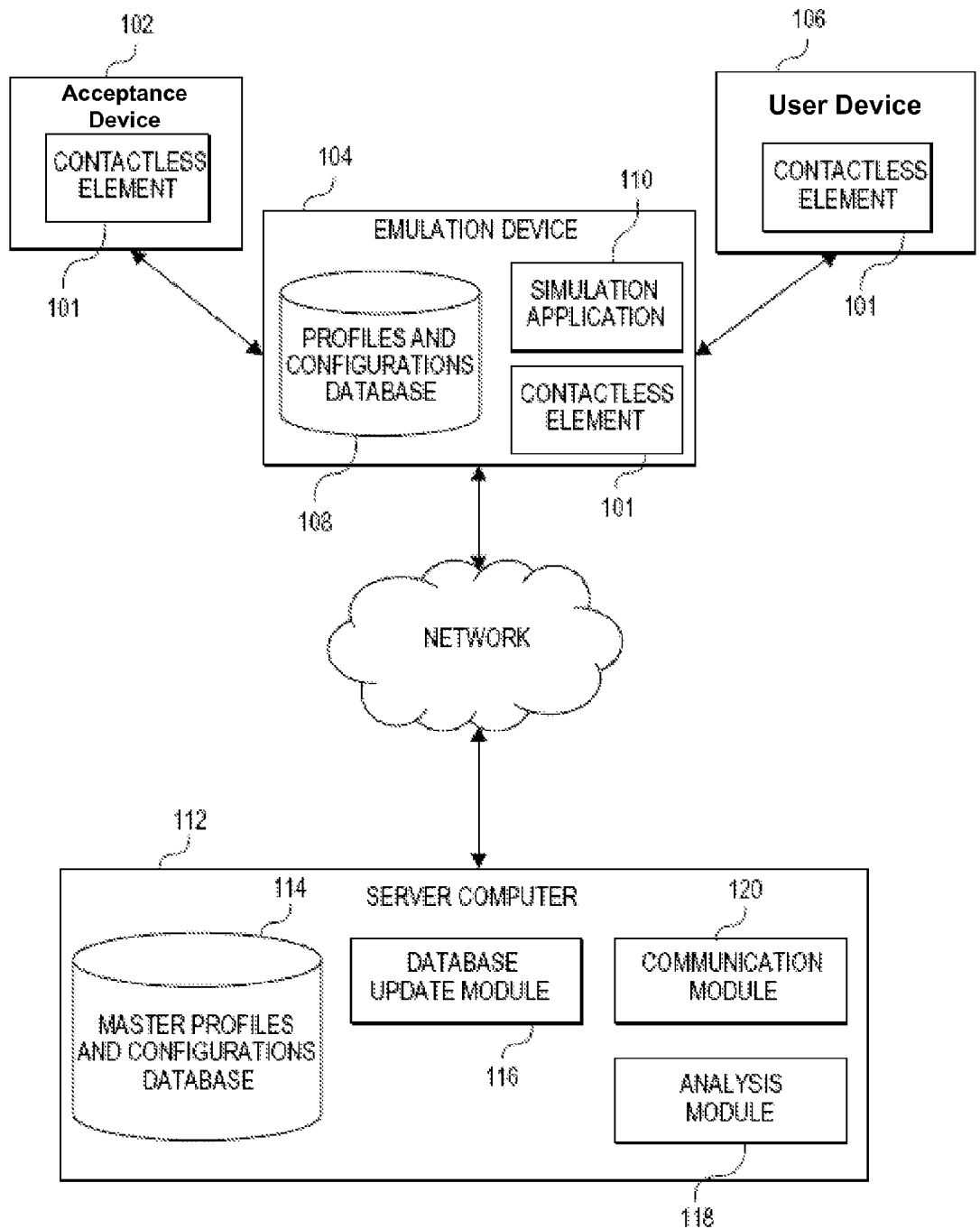
FIG. 1 shows an exemplary system and components in accordance with some embodiments.

Embodiments provided herein may include systems, apparatuses, and methods for contactless testing of contactless transaction devices by, for instance, utilizing a device that can emulate a plurality of contactless acceptance devices (e.g. access devices) and/or user contactless devices (e.g. portable consumer devices) in simulated contactless transactions. As noted above, although it may be preferred that such systems, methods, and apparatuses are utilized in the context of simulating or conducting financial transactions, embodiments are not so limited. Indeed, as would be appreciated by one of ordinary skill in the art after reading this disclosure, the system and methods developed by the inventors and disclosed herein may generally be utilized to test devices comprising contactless interfaces regardless of the intended use (particularly when there may me multiple contactless devices that have different parameters, configurations, characteristics, or other features that may be emulated).

Embodiments may provide some advantages. For example, some embodiments provided herein may increase the efficiency of testing a contactless transaction device for compatibility with multiple contactless user devices (e.g. portable consumer devices, identification cards, coupon cards, etc.) or contactless acceptance devices (e.g. access devices) by using a single device that emulates a plurality of other devices. Furthermore, the use of an emulation device (such as a mobile phone) may provide the ability to record and later analyze data about the simulated transactions to enable more efficient trouble shooting for simulated transactions that fail. In addition, in some embodiments, the ability to transmit relevant contactless transaction device profiles over a network (e.g. the Internet, a cellular network, data network, WLAN, etc.) may reduce costs associated with the physical transport of reference devices, decrease testing times and time to market for new products, and/or allow for real time adjustment and update of profile information.

Some terms may be described in further detail as follows:

An "access device" may be any suitable device for communicating with merchant and for interacting with a portable consumer device. An access device can be in any suitable location such as at the same location as a merchant. Access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. Typically, an access device may use any suitable contact or contactless mode of operation to send or receive data from a portable consumer device.

As used herein, the term "comprising" is not intended to be limiting, but may be a transitional term synonymous with "including," "containing," or "characterized by." The term "comprising" may thereby be inclusive or open-ended and does not exclude additional, unrecited elements or method steps when used in a claim or describing embodiments. For instance, in describing a method, "comprising" indicates that the claim is open-ended and allows for additional steps. In describing a device, "comprising" may mean that a named element(s) may be essential for an embodiment, but other elements may be added and still form a construct within the scope of a claim. In contrast, the transitional phrase "consisting of" excludes any element, step, or ingredient not specified in a claim or when describing an embodiment. This is consistent with the use of the term throughout the specification.

A "contactless transaction device" may refer to any device that may be involved in, and capable of, completing a contactless transaction. This term is intended to include both "contactless user devices" (such as portable consumer devices—e.g. smart cards) and "contactless acceptance devices" (such as access devices—e.g. POS devices).

A "contactless user device" may refer to any devices which may be presented by a user or consumer so as to provide information to a contactless acceptance device, such as to pay for a transaction, identify the user, gain access to an area (whether physical or virtual) or protected information, identify or obtain a service or product, or any other suitable purpose. Examples of contactless user devices may include, but are not limited to, portable consumer devices, coupon or membership devices, identification devices or tokens, and any other suitable contactless device.

A "contactless acceptance device" may refer to any device that may be utilized to receive information from a user contactless device via a contactless interface or communication. Such devices may include, by way of example only, access devices for financial transactions (e.g. devices that are typically located at a merchant and/or interact with a portable consumer device to authorize and complete a financial transaction). Other examples may include security or admission devices that identify a user and/or provide access to facilities (such as devices used to gain entry into sporting events, public transportation facilities, membership areas, etc.) information, services, work stations, or products.

An "emulation device" is a device that may be capable of emulating (i.e. functioning in a contactless transaction as if it were the same as) a contactless acceptance device (e.g. an access device) or contactless user device (e.g. portable consumer device) for which it has information about the profile of such device. In some embodiments, the emulation device is in operative communication through a network to a server computer for receiving profile information and, in some embodiments, to also transmit information about testing results for further analysis. In some embodiments, the emulation device has short range wireless communication capabilities (such as near-field communication). In some embodiments, the emulation device may comprise a portable handheld device (such as a mobile phone).

A "portable consumer device" may be any suitable device that allows a transaction to be conducted with a merchant. A portable consumer device may be in any suitable form. For example, suitable portable consumer devices can be hand-held and compact so that they can fit into a consumer's wallet and/or pocket (e.g., pocket-sized). They may include smart cards, magnetic stripe cards, keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, 2-D barcodes, and the like.

A "profile" can refer to attributes, parameters, and/or configurations of a contactless transaction device (e.g. a contactless user device such as a portable consumer device or a contactless acceptance device such as an access device) that defines or provides information as to how each device corresponding to the profile conducts contactless transactions, the type of information provided by such devices, and/or the format and methods that the data may be transmitted. The profile of a contactless transaction device may include some or all of the following: the information that is provided by the contactless transaction device in a transaction (including the structure of any messages, data packets, header information, etc.), an encryption algorithm or other transmission protocols used by the contactless transaction device; the type of verification or authorization that is used to complete the transaction (e.g. whether an additional personal identification number or bio-metric security data is also to be entered—for example, for financial devices, whether such profiles correspond to "chip and PIN devices" such as in Europe or signature authorization); the contactless application used (e.g. magnetic stripe data, quick VISA® smart Credit and Debit (qVSD), etc.); the type of contactless communication used (e.g. infra-red, RFID, Bluetooth™, etc); and any other relevant configuration or transaction related information. In addition, a profile may also contain logic that could change the behavior of device depending on the behavior of the device it is interacting with. For example, the logic could relate to a specific encryption algorithm that must be used when a first contactless transaction device interacts with a second contactless transaction device, but the same encryption algorithm may not be used when the first contactless transaction device interacts with a third contactless transaction device that is different than the second contactless transaction device. Thus, in general, by utilizing a contactless transaction device profile, an emulation device may conduct a transaction in the same manner as the associated contactless transaction device.

"Short range communication" or "short range wireless communication" may comprise any method of providing short-range communications capability, such as RFID, Bluetooth™, infra-red, or other data transfer capability that can be used to exchange data between a contactless user device (e.g. portable consumer device), a contactless acceptance device (e.g. an access device), and/or an emulation device. In some embodiments, short range communications may be in conformance with a standardized protocol or data transfer mechanism (e.g., ISO 14443/NFC). Short range communication typically comprises communications at a range of less than 5 meters. In some embodiments, it may be preferable to limit the range of short range communications (such as to a range of less than 1 meter, less than 10 centimeters, or less than 2.54 centimeters) for security, technical, and/or practical considerations. For instance, with reference to a financial transaction, it may not be desirable for a POS terminal to communicate with every portable consumer device that is within a 5 meter radius because those two devices may not be involved in a transaction, or it may interfere with a current transaction involving different financial transaction devices.

A "test contactless transaction device" is a device for which it is desired to determine if it is capable of completing a transaction with one or more other contactless transaction devices. Typically a test contactless transaction device is a new or updated device that is not yet in commercial or general use. A test contactless transaction device may comprise a contactless user device such as a portable consumer device or a contactless acceptance device such as an access device. In some embodiments, a test contactless transaction device may comprise an emulation device that comprises a profile of a contactless transaction device.

A "transaction" such as when used in the term "contactless transaction device" or "simulated transaction" does not require a "financial transaction," but is generally meant to refer to any instance in which two devices may exchange data, information, or otherwise interact. Although in some instances, such transactions may be part of larger or additional transactions (such as the completion of a financial transaction), embodiments are not so limited. A "simulated transaction" may refer to a transaction that is conducted (at least in part) so as to determine whether a contactless transaction device is compatible with another contactless transaction device (or a profile corresponding to the contactless transaction device).

Currently, the testing of contactless transaction devices (such as in the financial transaction context) typically involves presenting multiple contactless user devices (e.g. portable consumer devices such as "reference cards") to a contactless acceptance device (e.g. an access device) so as to verify that the contactless acceptance device behaves as expected with each of the contactless user devices. Similarly, a step in the contactless user device testing process involves presenting the contactless user device (such as a portable consumer device) to multiple contactless acceptance device (e.g. access devices such as reference terminals) to verify that the contactless user device behaves as expected with each of the contactless acceptance devices. These approaches are inefficient as they require the tester to acquire (or otherwise have access to) multiple contactless user devices or multiple contactless acceptance devices. It may also require that the tester be trained and/or have specific knowledge in how to perform the testing of the contactless transaction devices for proper verification that the test contactless transaction device is acceptable. Another problem that this approach may present is that when a failure occurs, there is usually no trace of the communication between the two contactless transaction devices to assist with the analysis of any issue(s) that gave rise to the failed transaction.

Embodiments of systems and methods provided herein may utilize devices that have short range communication capabilities (such as portable handheld devices—e.g. mobile phones) to emulate the necessary or desired reference contactless user devices (e.g. the reference portable consumer devices) or contactless acceptance devices (e.g. the reference access devices such as POS terminals) using a single connected device. In some embodiments, the emulation device may be user friendly by providing step-by-step instructions to the user conducting the tests. This may allow for untrained persons (e.g. non-technicians) to conduct the testing of the contactless transaction devices, which can thereby save time and expense. In some embodiments, the emulation device may also record the communication between the contactless user device and the contactless acceptance device to assist with the analysis of the simulated transactions. This analysis can be performed either on the device itself or communicated to some other entity for analysis at some future point. By recording information about the communications and the simulated transactions, it may be easier to determine the cause of any problems and/or compatibility issues with a particular type of contactless user device or contactless acceptance device.

In some embodiments, a contactless test system comprises a server application (e.g. a software and/or hardware module (s)) linked to (e.g. capable of being in operational communication with) software and/or hardware modules/applications on a short range communication enabled device (i.e. an emulation device, which may comprise a mobile phone). The server may be continually updated with the most up-to-date set of reference contactless user device and contactless acceptance device profiles/configurations. The software application modules and/or hardware configurations on the emulation device may periodically check the server (e.g. send an electronic query or request to the server via a network or interface) for any updates to profiles and configurations. In some embodiments, the server computer may automatically update the profiles and configurations stored on the emulation device (such as through a push functionality). In this way, the emulation device will be more likely to perform contactless tests using the most recent profiles, and any new profiles can be automatically updated on the device (the device may also be updated semi-automatically update, such as by providing a user of the emulation device with the option to update the profiles stored thereon).

In some embodiments, when conducting testing of contactless transaction devices, the emulation device software and hardware modules/application may be configured by a user to perform a set of tests. For instance, the emulation device may be configured either to test a portable consumer device (e.g. a card) or an access device (e.g. a terminal). In some embodiments, it may only be necessary to perform testing on a subset of all of the profiles available, such as a subset of tests for a specific market or region, etc. For example, with reference to example embodiments comprising financial transaction devices, different geographic regions typically utilize only a subset of available profiles for access devices and portable consumer devices. Therefore, for instance, if a contactless transaction device (e.g. in the form of a financial transaction device) will only be used with other devices in a particular geographic region, there may be no need to utilize all of the reference profiles available. Other examples of when less then all available profiles may be tested may include such situations where the device has already passed testing for devices in one or more regions.

Continuing with this exemplary embodiment, the user may then follow instructions that may be provided by the emulation device software applications/hardware configurations to perform the relevant contactless tests for simulated contactless transactions. The emulation device application may inform the user as to the outcome of each test (e.g. whether the test contactless transaction device passed or failed) and possibly the reason for any failure of a specific test. In some embodiments, the results of each test will also be communicated by the emulation device application (for instance, via a cellular network, the internet, LAN, WLAN, USB interface, or other physical or wireless interface) to the server (e.g. software application/hardware configurations) for further analysis. This transmission may occur after each test, or the results for a plurality of tests may be batched and transmitted together.

In some embodiments, the systems, apparatuses, and methods described above may be utilized to perform field testing of contactless devices. Whereas the testing described above related to determining if a test contactless transaction device was capable of conducting transactions with multiple and varied contactless transaction devices (that is, whether it was compatible with contactless transaction devices having different profiles), a field test may involve utilizing the test contactless transaction device (or its profile) to actually conduct transactions with contactless transactions devices that are deployed in the field or are currently in operation. For example, for financial transactions, this may include tests that are conducted with merchants or consumers in the market place. Currently, field tests for financial transaction devices typically involve sending the test contactless transaction devices to different parts of a market and conducting scripted transactions. This may be time consuming and expensive, as it requires the test contactless transaction device to be transported to different locations.

In addition to embodiments in which the emulation device may be utilized to emulate a plurality of reference contactless transaction devices to determine the capabilities of a test contactless transaction device, in some instances, an emulation device may also be utilized to emulate the profile of the new or updated (e.g. the "test") contactless transaction device in conducting transactions in the field test. That is, the emulation device may utilize the profile associated with the new or updated device to test its functionality in the market place. For instance, in the context of financial transactions, an emulation device may comprise the profile of a new portable consumer device, which may be linked or associated with a payment account (such as a bank account). The emulation device may be presented at a merchant to pay for a transaction and may utilize the profile of the portable consumer device and the associated bank account to complete the transaction. The same device profile (which may be linked to the same test payment account) may be sent to additional emulation devices that may be disposed in different areas or markets, and may also be used in similar contactless tests. In this way, a new device or profile may be readily tested in multiple markets or areas without requiring a single device (or multiple reference devices) to be physically transported to different locations. Embodiments may present several advantages, including a decrease in expense and cost as the profile may be readily accessed from a remote server, thereby eliminating the need to physically transport the test financial transaction device. Furthermore, any problems with the transaction can more readily be reported and analyzed.

In some embodiments, particularly when field-testing contactless transaction devices designed for use in financial transactions that may thereby be linked to one or more test payment accounts, it may be desirable to use "conditional controls" to define the types of merchants and/or transactions that the programmed emulation device could be used to test. That is, the specific transactions may be scripted and programmed either on the emulation device itself, or at the issuer of the payment account that is linked to the profile of the portable consumer device that is emulated. In this manner, if the emulation device is stolen or otherwise misused, transactions other than those designated will be declined.

Specific details regarding some of the above-described aspects are provided below. The specific details of the specific aspects may be combined in any suitable manner without departing from the spirit and scope of embodiments of the invention.

I. Exemplary System

With reference to FIG. 1, an exemplary system for performing contactless testing of contactless transaction devices is illustrated. As shown in FIG. 1, an emulation device 104 is in operative communication with both contactless acceptance device 102 (e.g. an access device) and/or contactless user device 106 (e.g. a portable consumer device). This is merely for illustration purposes and is shown to describe the potential functionality of the system. That is, emulation device 104 may be utilized to test either a contactless acceptance device 102 or a contactless user device 106. Each of these devices was described in detail above.

In this exemplary embodiment, each of the contactless acceptance device 102, contactless user device 106, and emulation device 104 comprises a contactless element 101. The contactless element, may, for instance, comprise an antenna coupled to an integrated circuit chip for wirelessly transmitting and receiving data stored on a device. However, any method including those described above (such as infrared, Bluetooth™, optical scanning, etc.) may be utilized by these devices to establish short range wireless communications. Emulation device 104 also comprises profiles and configurations database 108. This database may comprise the various profiles and configuration information for financial transaction devices that may be emulated by the emulation device 104. However, this information may be stored in any suitable manner at emulation device 104. The simulation application 110 may be in communication with the profiles and configuration database 108 to conduct the testing of the contactless acceptance device 102 and/or the contactless user device 106. Although the profiles and configuration database 108 is illustrated as being located within the emulation device 108, other embodiments may locate the database elsewhere, or use other data structures to facilitate the use of the various profiles for testing.

As depicted in FIG. 1 in this exemplary embodiment, emulation device 104 is in communication with server computer 112 through a network. The network may be any suitable network, such as the Internet, a mobile cellular network, data network, WLAN, or any other wireless communication medium (or combination thereof). The exemplary server computer 112 is shown as comprising a master profiles and configuration database 114, a database update module 116, an analysis module 118, and a communication module 120. The master profiles and configurations database 114 may comprise the most up-to-date profiles for either access devices 102 and/or portable consumer devices 106 that are currently in use or that may be in use at a future date. This database update module 116 located on server computer 112 may be programmed or configured to add or remove profiles from the master profiles and configuration database 114 so as to maintain the most up-to-date group of profiles then in use. The database update module 116 may also retrieve profile information by querying the master profiles and configurations database 114 and retuning any requested information to communication module 120.

The communication module 120 may be configured or programmed to receive and transmit information through the network to emulation device 104. The received information may comprise, for instance, requests by the emulation device 104 for profile information. In some embodiments, the received information may also comprise data related to the results of contactless testing performed by the emulation device 104 with either an access device 102 or a portable consumer device 106. The communication module 120 may transmit this information to the database update module 116 or the analysis module 118 as appropriate. The analysis module 118 may be programmed or configured to receive data related to contactless testing provided by the emulation device 104, and determine if the test contactless transaction device (e.g. an access device or portable consumer device) should be issued a certificate showing that it is approved for use, or it may generate a report with any errors found during testing.

It should be appreciated that the various software and hardware modules described above were provided above for illustration purposes only. The various functionalities described above could be provided by one, or more than one, software application and/or hardware component (such as a microprocessor of application-specific integrated circuit in combination with one or more memory devices, whether volatile or non-volatile). Moreover, some of the functionality may be provided by more than one component or device, where each device or component may be disposed in a different location. For instance the master profiles and configurations database could comprise a plurality of databases disposed in different locations.

Figure 2A:
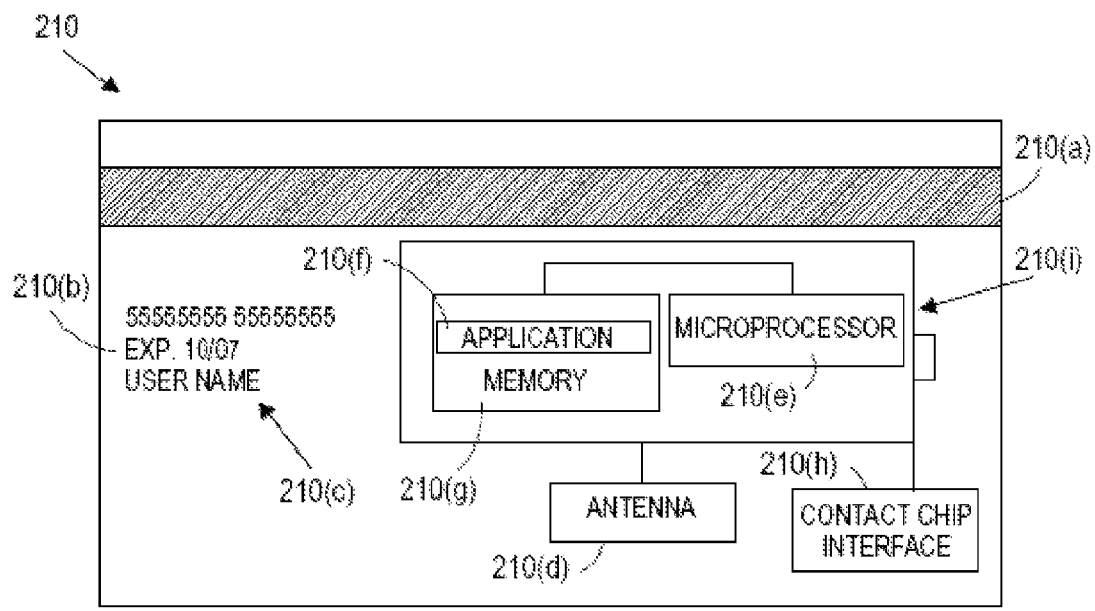
FIGS. 2(a) and (b) show exemplary contactless transaction devices in accordance with some embodiments.

FIG. 2(a) provides an illustration of an exemplary contactless user device in the form of a portable consumer device that comprises smartcard. As noted above, in some instances, a preferred embodiment may comprise contactless transactions devices that may be used in financial transactions; however, embodiments are not so limited. FIGS. 2(a) and (b), and FIG. 3 are provided herein for illustration purposes only. Returning to FIG. 2(a), in this example embodiment, the smartcard may be in the form of a payment card, such as a credit card. The card may include a contact interface 210(a), such as a magnetic stripe and/or other contact means, such as a contact chip plate 210(h) capable of both reading and writing data stored within the memory 210(g) of the magnetic stripe of the card. The smartcard of FIG. 2 may include an account identifier associated with an account. In addition, the card may include a contactless interface, which in some embodiments may comprise an antenna 210(d) coupled to an integrated circuit chip 210(i) for wirelessly transmitting and receiving data stored on the card. It should be understood that the smart or contactless card may include any form of short range wireless communication capability. For example, in some embodiments an RF element may be used. In such embodiments, when the RF element is placed within an electric field generated by a POS terminal, the RF element may cause data associated with the contactless card to be transmitted to the POS terminal. For example, the account identifier may be transmitted to the POS terminal.

Figure 2B:
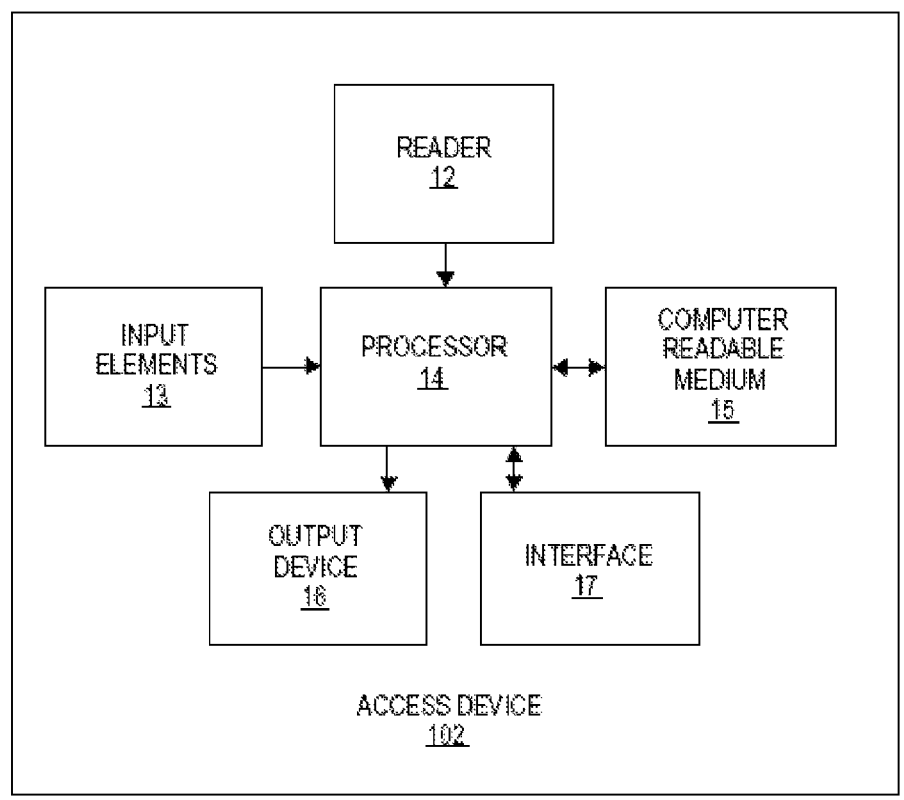
FIG. 2(b) shows an exemplary contactless acceptance device in the form of an access device.
Figure 3:
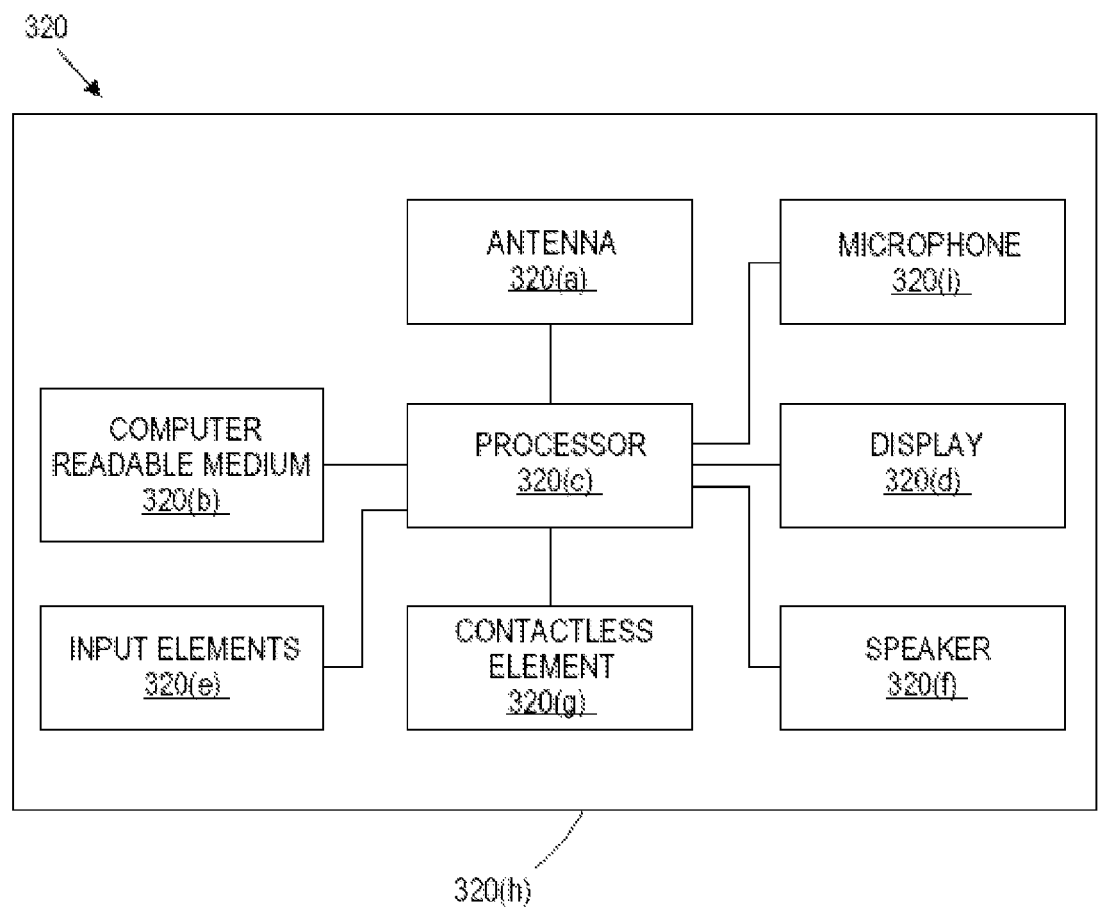
FIG. 3 shows an exemplary emulation device in accordance with some embodiments.

FIG. 2(b) provides an illustration of a contactless acceptance device in the form of an access device in accordance with some embodiments for financial transactions. Again, FIG. 2(b) is provided as an access device for illustration purposes only, and may comprise many components or features that may be common to contactless acceptance devices. Returning to FIG. 2(b), as noted above, the term access device 102 can be utilized interchangeably with terminal, point of sale (POS) device or terminal, and/or reader and terminal within the present disclosure, particularly when referencing financial transactions. The access device 102 is shown as comprising a processor 14 operatively coupled to a computer readable medium 15 (e.g., one or more memory chips, etc.), input elements 13 such as buttons or the like, one or more readers 12 (e.g., a barcode reader, optical scanner, contactless element reader or interface such as an RFID, Bluetooth™, infrared, etc.), an output device 16 (e.g., a display, a speaker, etc.) and an interface 17. Although not expressly shown, access device 102 may comprise a communication module and associated software/hardware to communicate with a payment processing network (such as VisaNet®). A housing can contain one or more of these components. The computer readable medium 15 can comprise instructions or code, executable by a processor, that may provided any suitable functionality (e.g. software modules) for conducting a contactless transaction (such as providing/controlling power to a contactless element, establishing communication with a contactless user device, receiving data in one or more data formats from the contactless user device) as well as functionality associated with the other components of conducting a financial transaction (such as generating an authentication request message). The interface 17 can be a wired or wireless interface capable of communication with the merchant register. In another embodiment, interface 17 can be a network interface for direct communication with an acquirer, a payment processing network, server computer, merchant computer apparatus, or any other device.

It should be understood that in some embodiments, an access device may comprise many different features and have different components. For instance, an access device may comprise a Proximity Coupling Device with Application (PCDA), which contains all the components to perform a payment transaction (for example, it includes quick VISA® Smart Debit and Credit (qVSDC) and/or magnetic stripe data (MSD) application with the contactless interface). This type of configuration is generally, but not limited to the following types: A stand alone device (i.e. terminal, POS, EPOS) that supports all the components for the contactless transaction; or a reader type device that supports all the components for the contactless transaction, but is meant to be connected to another device (i.e. terminal, POS, EPOS), to carry out the transaction (i.e. communicating with an issuer and/or an acquirer for authorization for the transaction). Such readers are generally referred to as "intelligent readers." In other embodiments, the access device may comprise only a proximity coupling device reader (PCDR), which is a contactless reader that support sonly the contactless interface. In some embodiments, the access device may comprise a proximity coupling device integrated (PCDI), which is a device that supports traditional (non-contactless transactions) as well as contactless transactions like qVSDC and contains or is connected to a PCDR.

FIG. 3 shows exemplary components that could comprise the hardware of an exemplary emulation device in the form of a handheld portable device such as a mobile device 320. The exemplary emulation device 320 may be, for instance, in the form of a mobile phone and may comprise a computer readable medium 320(b) and a body 320(h). The computer readable medium 320(b) may be present within the body 320(h) of the device, or may be a detachable or separate unit from the device 320. The computer readable medium 320(b) may comprise some or all of the functionality that may be utilized with one or more of the hardware features of the emulation device 320 to provide the functionality described above with reference to the simulation application 110 in FIG. 1, as well as the associated functionality described in FIGS. 4, 6, and 8. The body 320(h) may be in the form a plastic substrate, housing, or other structure. The computer readable medium 320(b) may be a memory that stores data (volatile and/or non-volatile) and may be in any suitable form including a magnetic stripe, a memory chip, uniquely derived keys, encryption algorithms, etc. The memory also preferably stores profile information associated with portable consumer device or access device configurations, and may thereby comprise some or all of the information associated with the profiles and configurations database 108 described above in FIG. 1 (that is, in some embodiments, the profiles and configuration database 108 need not comprise a separate database, but may be comprise system memory and associated data structure(s) within the emulation device 104).

The exemplary emulation device 320 may further include a contactless element 320(g), which may comprise any suitable interface and may depend on the type of short range wireless communications the device is configured to utilize. Contactless element 320(g) may be associated with (e.g., embedded within) exemplary emulation device 320 and data (such as profile information) transmitted via a network (such as a cellular or data network, WLAN, or other wireless network) may be applied to contactless element 320(g) by means of a contactless element interface (not shown). The contactless element interface functions to permit the exchange of data (such as the information that is typically transmitted in a financial transaction performed by an emulated device) between the emulation device circuitry and a contactless element 320(g).

As noted above, contactless element 320(g) may be capable of transferring and receiving data using a short range communication capability. For example, in some embodiments, the short range communications may utilize a near-field communications medium, typically in accordance with a standardized protocol or data transfer mechanism (e.g., ISO 14443/NFC). Short range communication capability may comprise any suitable technology, such as RFID, Bluetooth, infra-red, or other data transfer capability that can be used to exchange data between the exemplary emulation device 320 and another device. Thus, the exemplary emulation device 320 may be capable of communicating and transferring data and/or control instructions via both a cellular network and short range wireless communication.

The exemplary emulation device 320 may also include a processor 320(c) (e.g., a microprocessor) for processing the functions of the exemplary emulation device 320 and a display 320(d) to allow a consumer to see phone numbers and other information and messages. The exemplary emulation device 320 may further include input elements 320(e) to allow a consumer to input information into the device, a speaker 320(f) to allow the consumer to hear voice communication, music, etc., and a microphone 320(i) to allow the consumer to transmit her voice through the emulation device 320. The exemplary emulation device 320 may also include an antenna 320(a) for wireless data transfer (e.g., data transmission), and a camera (not shown) which can provide image data to the processor 320(c).

It should be understood that while the embodiments discussed above described specific devices comprising specific components, these were for illustration purposes only. Other embodiments may include some of the components listed above, o may include additional components. Also, in some embodiments, the components may be located on separate devices or platforms, and may be in operative communication.

II. Exemplary Methods

Figure 4:
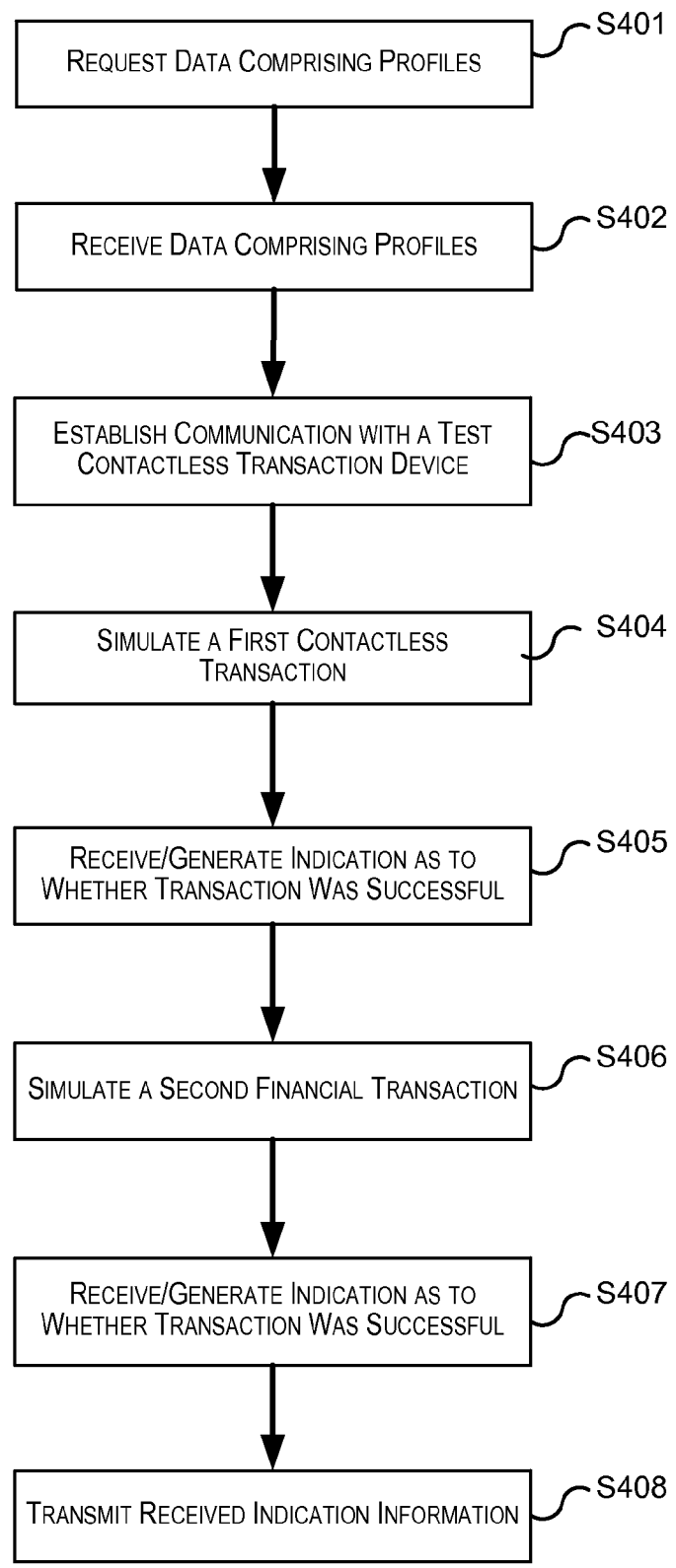
FIG. 4 shows a flow chart of an exemplary method that may be performed by an emulation device in accordance with some embodiments.
Figure 5:
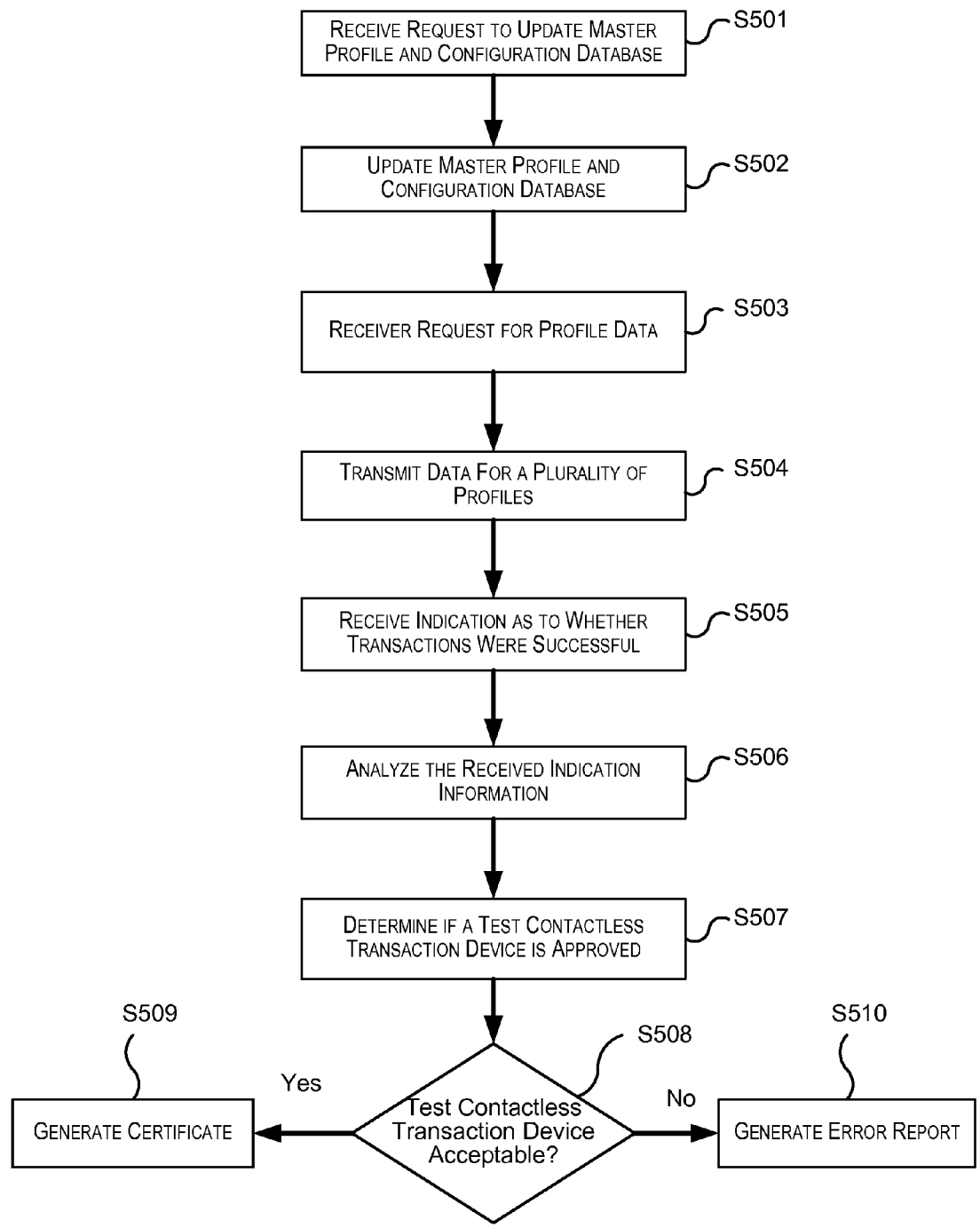
FIG. 5 shows a flow chart of an exemplary method that may be performed by a server computer in accordance with some embodiments.
Figure 6:
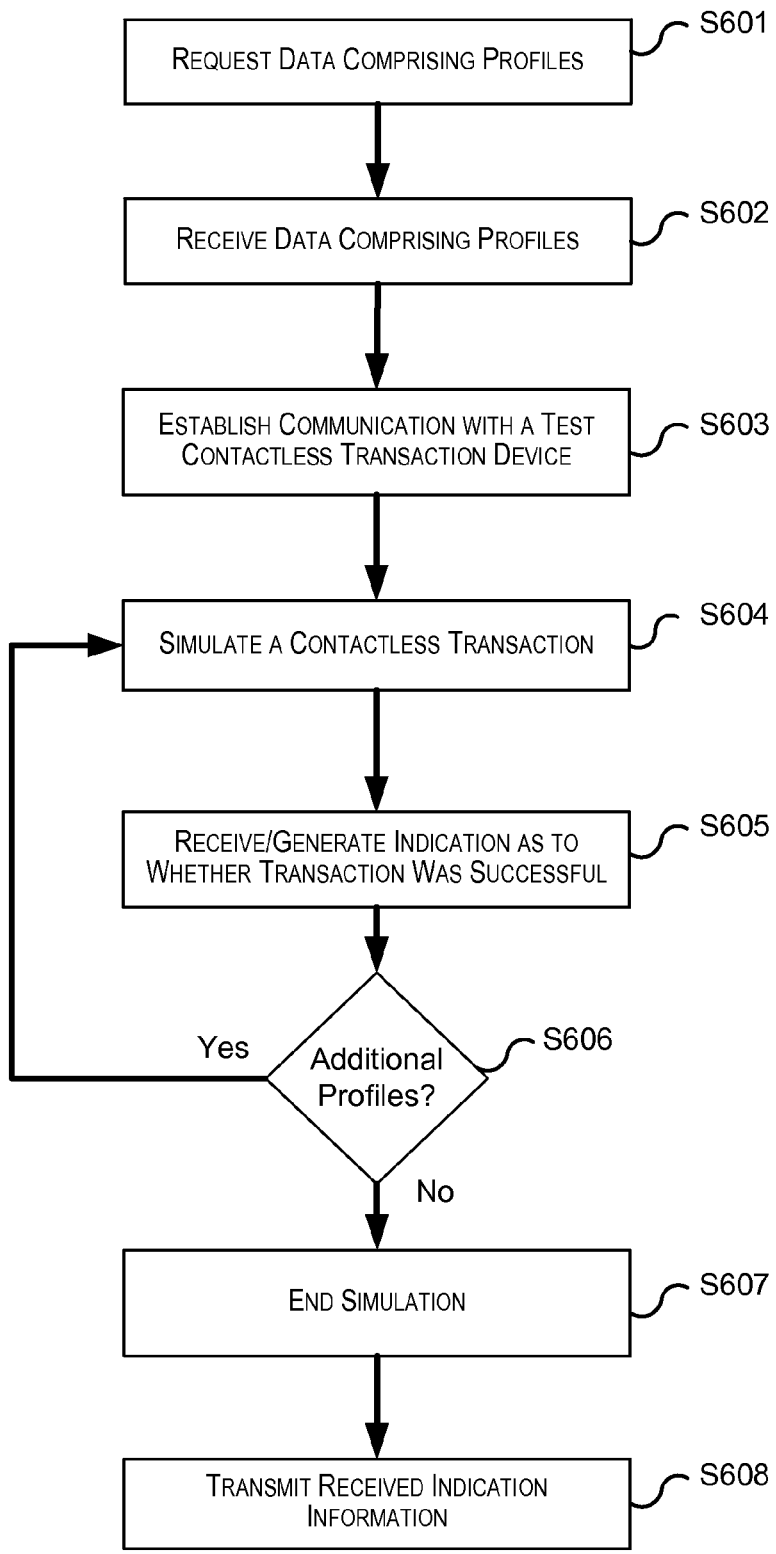
FIG. 6 shows a flow chart of an exemplary method that may be performed by an emulation device in accordance with some embodiments.

Methods according to embodiments can be described with respect to FIGS. 4-6. It should be understood that these are exemplary embodiments and are for illustration purposes only.

With reference to FIG. 4, an exemplary embodiment of a contactless test is described. At step S401, a request may be sent by an emulation device 104 to the server computer 112 for some or all of the profiles in the master profiles configuration database 114. This request may establish a communications session between the emulation device 104 and the server 112. The database update module 116 of the server computer 112 may query the master profiles and configuration database 114 and may return, using the communication module 120 any new or requested profiles to the emulation device 104. These profiles may be associated with, for exemplary financial transaction devices, access devices, portable consumer devices, or both. At step S402, the emulation device receives the profile data, and may store it locally in the profile and configurations database 108, or in any other suitable memory or memory structure. For example, in some embodiments, the profile information may only be temporarily stored in volatile memory.

At step S403, the emulation device 104 may establish communication via a short range communication contactless element 101 with a test contactless transaction device. As described above, in some embodiments the test contactless transaction device may comprise a contactless acceptance device such an access device 102, while in some embodiments the test contactless transaction device may comprise a contactless user device such as a portable consumer device 106. The communication may be through any suitable short range communication means, as described above. At step S404, the emulation device 104 simulates a first transaction with the test contactless transaction device. This may be performed by simulation application 110, which may utilize the profile and configuration information stored in the profiles and configurations database 108 to transmit data corresponding to an emulated device. As noted above, the profile information may define the type of information to be sent, as well as how the data is sent (using, for example, any protocols and encryptions algorithms). In this manner, a transaction may be simulated based on the profile of contactless transaction devices that are not actually involved in the transaction.

As noted above, a simulated transaction may involve exchanging data between the emulation device 104 and the test contactless transaction device in a manner that is consistent with the typical use of the device. For instance, in some embodiments of a financial transaction, financial data such as account numbers, card verification codes, and other information may be transferred and utilized in forming an authorization request message. Thus, a simulated transaction may involve the exchange of such information and/or additional processing associated with generating an authentication request message (or determining if an authentication request message could be generated).

At step S405, an indication may be received as to whether the simulated transaction was successful completed. For instance, for embodiments where the emulation device 104 is emulating a contactless user device such as a portable consumer device, the emulation device may receive a response from the reference contactless acceptance device 102 as to whether the information was processed properly and the transaction could be completed. For embodiments where the emulation device 104 is emulating a contactless acceptance device such as an access device, this indication may be generated by the emulation device 104 itself. Any information related to the transaction (including error messages for transactions that failed) may be generated, stored, and/or transmitted (e.g. to server computer 112) by the emulation device 104.

At step S406, the contactless test process may be repeated for a second profile—that is, a profile of a contactless transaction device that is different than the profile that was simulated in the first financial transaction. This process can be repeated any number of times until all of the desired profiles have been tested for compatibility with the test contactless transaction device. At step S407, an indication as to whether the transaction was successful (which may include additional information, such as the reason for any errors) may be received or generated by the emulation device 104 for each of the profiles tested.

In some embodiments, at step S408, any information that was stored locally at the emulation device 104 during the steps S405 and S407 may be consolidated and transmitted to the server computer 112 in a batch. The server computer 112 may receive this information, and analysis module 118 may determine if the test contactless transaction device should receive a certificate as being compatible with the current configuration of devices in use (or to be in use). In some embodiments, if it is determined that an error occurred in a simulated transaction, the analysis module 118 may determine the cause of the error, generate an error report, and/or store the error information at server computer 112. In this manner, a contactless test of a test contactless transaction device may be conducted using a single emulation device 104 utilizing the profiles of one or more other contactless transaction devices.

With reference to FIG. 5, another exemplary method is described that may correspond to one or more functions that may be performed by a server computer, such as the exemplary server computer 112. At step S501, the server computer 112 may receive a request to update the master profile and configuration database 114 (or may request or query another database or server for any available updates). This may be, for instance, because a new profile of a contactless transaction device is to be added, for which new devices are to be tested against. This may also be, for instance, because a particular profile is no longer active and therefore devices no longer need to be tested to be compatible with such devices. At step S502, the database update module 116 may perform any modification to the master profiles and configurations database 114 needed (including updating any database mapping tables).

At step S503, the server computer 112 may receiver a request at communication module 120 for profile data located in the master profiles and configurations database 114. The request may be from an emulation device 104, or a device that may be in operative communication with the emulation device. The request may, for instance, be for a specific profile, for only profiles that are new or updated since the last update received by the emulation device 104, or may be for all of the profiles in the database (or all of the profiles for a particular region, product, etc.). At step S504, the server computer 112 may query the master profiles and configuration database 114 using database update module 116 and may then transmit any retrieved data, using the communications module 120, to the emulation device 104. The transmitted data may comprise data for a plurality for profiles corresponding to reference contactless transaction devices.

At step S505, the server computer 112 may receive an indication as to whether some or all of the simulated transactions were successful. The data may include information about any errors that occurred. At step S506, the received data may be analyzed at the server computer 112 by the analysis module 118. At step S507, a determination may be made by the analysis module 118 as to whether the test contactless transaction device should be approved for use (or at least, that it has passed the contactless test). This may be based on any suitable criteria, and need not require a 100% pass rate (although this may be generally preferred). At step S508, the server computer 112 may then transmit a response back to the emulation device, or to another computer apparatus, indicating the results of the analysis. In some embodiments, if the test contactless transaction device is approved for use (or passed the contactless test), the server computer 112 may generate and issue a certificate at step S509. If the test was not successful, then at step S510 an error report may be generated, which may be utilized to determine any problems with the test device, and may further assist in addressing those issues.

FIG. 6 shows another exemplary method that may correspond to the steps that may be performed by an emulation device related to performing a plurality of simulated transactions. Steps S601-S605 are shown as being similar to steps S401-S405 described above. For example, at step S601, a request may be sent by an emulation device 104 to the server computer 112 for some or all of the profiles in the master profiles configuration database 114. At step S602, the emulation device receives the profile data, and may store this information locally in the profile and configurations database 108, or in any other suitable memory or memory structure. At step S603, the emulation device 104 may establish communication via a short range communication contactless element 101 with a test contactless transaction device. At step S604, the emulation device 104 simulates a contactless transaction with the test contactless transaction device. This may be performed by simulation application 110, which may utilize the profile and configuration information stored in the profiles and configurations database 108 to transmit data corresponding to a contactless transaction device. At step S605, an indication may be received as to whether the simulated transaction was successful completed. Any information related to the transaction (including error messages for transactions that failed) may be generated, stored, and/or transmitted (e.g. to server computer 112) by the emulation device 104.

At step S606, after a simulated transaction has been completed, the emulation device 104 may determine whether there are any additional profiles that are to be used in testing a contactless transaction device. This determination may be made by a user (e.g. at the beginning of the testing process or the emulation device 104 may provide the user with the option to select additional profiles during the testing process). In some embodiments, the determination may be made automatically by the emulation device 104 (such as when there may be a plurality of preprogrammed profiles that are to be tested). If there are additional profiles to be tested, then the method may return to step S604 where a subsequent contactless transaction is simulated, and the results of this subsequent transaction may then be received or generated by the emulation device 104 at step S605.

When a determination is made at step S606 that there are no additional profiles to be tested, then the method may proceed to step S607 where the simulation and testing may be terminated. At step S608, any data stored on the emulation device 104 may be transmitted to the server computer for further processing and analysis.

It should be noted that in some embodiments, at step S606 if a determination is made that there are additional profiles to be tested, the process may return to step S603 to establish a communication between the test contactless transaction device and the emulation device 104. That is, a new communication session may be established for each profile, rather than maintaining a communication session throughout the testing of each profile. This may, for instance, correspond to embodiments in which one or more of the profiles of the contactless transaction devices may have different configurations or parameters for establishing a communication session and/or exchanging data.

Figure 7:
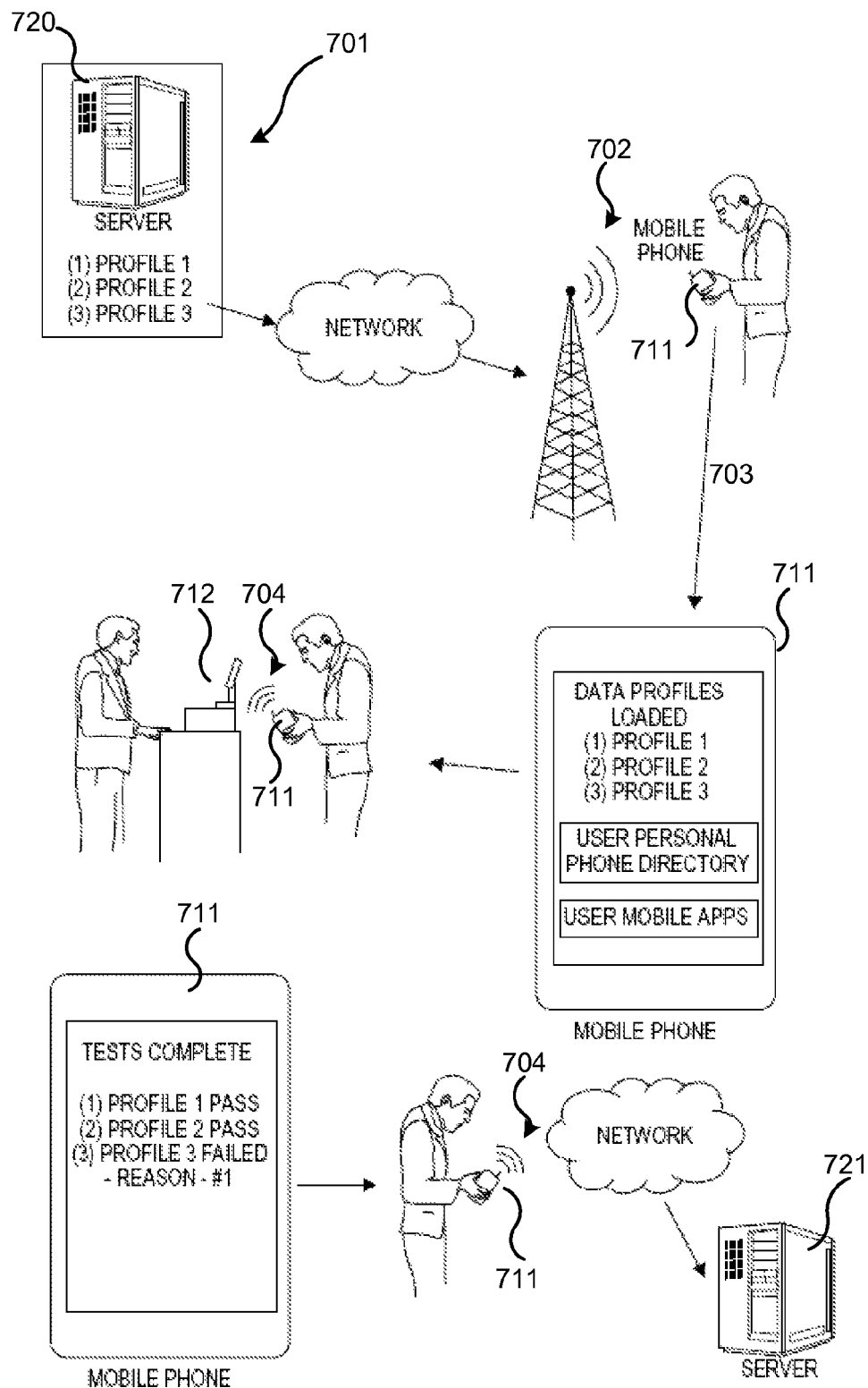
FIG. 7 shows a system and method that may be performed using one or more components of the system in accordance with some embodiments.

With reference to FIG. 7, an exemplary system is shown that may correspond to in-field testing of contactless transaction devices. As shown at 701, a server computer 720 comprises a plurality of profiles that correspond to a plurality of contactless transaction devices. In this example, the profiles may correspond to contactless user devices (such as portable consumer devices). These profiles may be transmitted through a network and at 702 transmitted wirelessly to an emulation device (shown in this example as a mobile phone 711). The mobile phone 711 could correspond, in some instances, to a user's personal mobile phone, or it could be a dedicated testing device. The use of a mobile phone may be preferred because such embodiments may allow for easier implementation of the systems and methods disclosed herein using current infrastructure and components.

At 703 the data corresponding to the plurality of profiles may be stored on the mobile phone 711. In addition to the data profiles, the mobile phone 711 may also comprise other information, such as user personal information (e.g. contacts, mobile applications, etc.). At 704, the mobile phone 711 may communicate with a contactless transaction device 712 (in this case shown as a contactless acceptance device) to simulate one or more transactions using the received profiles (e.g. "Profile 1," "Profile 2", and "Profile 3"). The mobile phone 711 may collect information regarding whether one or more of the tests were passed by the contactless transaction device 712. At 704, the information collected may then be sent wirelessly to the server computer 721 for further analysis and/or to generate a certificate or an error report. The server computers 720 and 721 may, but need not, comprise the same server in some embodiments.

Embodiments provided herein may offer some advantages. For example, by utilizing an emulation device to perform the contactless testing, there may be no need to physically send a plurality of physical testing contactless user devices (such as portable consumer devices—e.g. cards) to test a contactless acceptance device such as an access device. Moreover, in some embodiments, the use of the emulation device may alleviate the need to submit a contactless user device to a central facility that has a number of contactless acceptance devices (e.g. access devices) that the contactless user device may be tested with to determine if it is compatible with the various contactless acceptance device profiles. These tests can be conveniently conducted using a single emulation device (such as a mobile phone with short range communication capability). Thereby, both time and money may be saved. In addition, using a simulation application on an emulation device, which may provide step-by-step instructions to a user on how to conduct the contactless testing, my eliminate the need for these contactless tests to be conducted by trained technicians. This again may save time and money.

Furthermore, embodiments that utilize a server computer apparatus that comprises a database maintaining an up-to-date collection of profiles, along with providing continuous access to an emulation device via a network connection, may ensure that the contactless testing performed by the emulation device will use the most up-to-date profiles for financial transaction devices that are currently in use. In addition the use of an emulation device that can record technical information about the simulated test transactions, which may then provide that information for analysis in the event of an error, may make it easier to determine problems in a test device and to identify the proper way to correct such errors.

Exemplary Embodiments

In some embodiments, a first apparatus may be provided. The first apparatus may comprise a processor and a storage medium coupled to the processor. The storage medium comprises code executable by the processor for performing a first method. The first method may include the step of receiving data comprising a plurality of profiles. Each of the profiles may be associated with a contactless transaction device. The first method may further comprise the steps of: communicating with a test contactless transaction device using short range wireless communication, and using the plurality of profiles to emulate each of the contactless transaction devices associated with each of the profiles in a simulated transaction with the test financial transaction device.

As noted above, the profiles may be utilized by an emulation device to conduct (or simulate) contactless transactions using configurations, settings, and/or parameters associated with more than one contactless transaction device. Thus, unlike an example of a financial transaction using a virtual wallet to interact with an access device in a single transaction (e.g. to purchase a good or service), embodiments provided herein may be utilized to conduct several transactions with an access device using the profiles of different portable consumer devices (or vice versa). The transactions may be conducted sequentially in an autonomous (e.g. the simulation module on the emulation device may programmed or configured to automatically conduct a series of transactions using some or of the profiles stored therein) or each test may be initiated manually (e.g. based on user input, such as the selection of each profile or providing an indication to proceed with additional transactions).

In some embodiments, in the first apparatus as described above, the contactless transaction may comprise a financial transaction. However, as noted embodiments are not so limited and therefore, in some embodiments, the contactless transaction may comprise, by way of example only, a security access request (e.g. a user may present a security ID or badge to access a building or be granted access to sensitive or secure information), coupon application, an identification determination, an admission request (such as request for access to a sporting event or mass transit fare application), an account identification, or an electronic lock system. As noted above, embodiment herein may be application to the testing and use of any suitable application of contactless devices (and thereby contactless transactions).

In some embodiments, in the first apparatus described above, the first method may further comprise the steps of receiving an indication for each simulation as to whether the simulated transaction was successful and transmitting the received indication related to the transaction to a server computer. In some embodiments, the indication may comprise information related to an error for a transaction that fails. This may provide the advantage of identifying possible errors with the test contactless transaction device because additional information may be determined in addition to a pass/fail indication.

In some embodiments, in the first apparatus as described above, the plurality of profiles may comprise contactless user device profiles and the test contactless transaction device may comprise a contactless acceptance device. In some embodiments, the contactless user device profiles may comprise portable consumer device profiles, and the contactless acceptance device may comprise an access device. That is, for example, the contactless transactions may correspond or relate to financial transactions. In some embodiments, the access device may comprise any one of: a proximity coupling device reader; a proximity coupling device integrated; and a proximity coupling device with application. In some embodiments, the access device may comprise a proximity coupling device reader coupled to any one of, or some combination of a terminal, a POS device, an EPOS device, an ATM, a personal computer, and a mobile phone.

In some embodiments, in the first apparatus described above, the plurality of profiles may comprise contactless acceptance device profiles, and the test contactless transaction device may comprise a contactless user device. In some embodiments, the contactless acceptance device profiles comprise access device profiles, and the contactless user device may comprise a portable consumer device.

In some embodiments, in the first apparatus described above, the step of communicating using short range wireless communication comprises any one of, or some combination of: radio frequency identification (RFID); Bluetooth™; or infra-red technology. In some embodiments, short range wireless communication comprises communications at a range of less than 5 meters. Preferably, the short range communications comprise communications at a range of less that 1 meter. More preferably, the short range communications comprise communications at a range of less than 10 centimeters. More preferably, the short range communications comprise communications at a range of less than 2.54 centimeters.

In some embodiments, the first apparatus as described above may comprise a handheld portable device. In some embodiments, the handheld portable device may comprise a mobile phone. In some embodiments, the handheld portable consumer device may comprise additional data corresponding to personal information of a user in addition to the plurality of profiles. As noted above, it may be preferred in some embodiments that the device be readily be deployable either in the field or in a test environment location, which may be some distance away from where the profiles of the contactless transaction devices may be located. The inventors have found that utilizing a handheld portable device may be particularly beneficial because it may be readily brought into communication with a test contactless transaction device (such as a contactless acceptance device). Moreover, mobile phones (and in particular smart phones) are readily available and may serve as an efficient platform for both receiving the plurality of profiles (particularly in remote or distant locations), utilizing the profiles to conduct simulated transactions, and then providing any test results back to a central location (or to otherwise provide the results for analysis).

In some embodiments, in the first apparatus as described above, the first method may further comprise the steps of: (a) after using one of the profiles to emulate one of the contactless transaction devices associated with the one profile in a simulated transaction with the test contactless transaction device, automatically determining whether any of the other profiles are to be used in a simulated transaction with the test contactless transaction device; (b) using at least one of the determined profiles in a simulated transaction with the test contactless transaction device; and (c) repeating steps (a) and (b) until it is determined that there are no other profiles to be used in a simulated transaction with the test contactless device. That is, for example, the emulation device may be programmed or configured to conduct a simulated transaction with a single test contactless device for each of a plurality of profiles. The device may be preprogrammed or configured to conduct simulated transactions with certain profiles, or a user may adjust the number and selection of profiles to be used. The emulation device may then proceed to conduct a simulated transaction for each of those profiles.

In some embodiments, in the first device as described above, each of the profiles may comprise any one of, or some combination of: a verification capability (such as any additional bio-metric security that may be used, Online Personal Identification Number (PIN), Offline Enciphered PIN, Offline Plaintext PIN, Signature, etc.), a data authentication capability (such as static or dynamic verification values); variable transaction specific data or parameters (e.g. for financial transactions, a common feature that some but not all contactless devices may provide is a low payment feature capability); encryption logic (e.g. logic that may dictate which encryption algorithm to use for any data transmitted between devices based upon the contactless device(s) involved in the transaction); and an authorization capability. As noted above, these are provided as examples and are not intended to be limiting. The profiles may thus be used in some instances to define or specify one or more configurations or parameters that may vary between two or more contactless transactions devices that may interact with the test contactless device when the test contactless device is deployed in the field or in commercial use.

In some embodiments, a first method may be provided. The first method may comprise the steps of (a) receiving, at a computer apparatus, data comprising a plurality of profiles, each of the plurality of profiles associated with a contactless transaction device; (b) communicating, by the computer apparatus using short range wireless communication, with a test contactless transaction device; (c) using, by the computer apparatus, a profile of the plurality of profiles to emulate a contactless transaction device associated with the profile in a simulated transaction with the test contactless transaction device; and (d) storing, at the computer apparatus, data indicating whether the simulated transaction was successful.

In some embodiments, in the first method as described above, the method may further comprise the steps of: (e) after using the profile in the simulated transaction, determining whether any of the other profiles are to be used in a subsequent simulated transaction with the test contactless transaction device; (f) if at least one profile is determined to be used in a subsequent simulated transaction, using the at least one determined profile in a subsequent simulated transaction with the test contactless transaction device; (g) storing, at the computer apparatus, data indicating whether the subsequent simulated transaction was successful; (h) repeating steps (e) and (f) until it is determined that there are no other profiles to be used in a simulated transaction with the test contactless device; and (i) transmitting the stored data to a server computer.

In some embodiments, a server computer may be provided. The server computer may comprise a processor and a storage medium coupled to the processor. The storage medium may comprise code executable by the processor for performing a first method. The first method may include the steps of transmitting data comprising a plurality of profiles to an emulation device, where each of the plurality of profiles is associated with a contactless transaction device. The first method may further comprise receiving an indication as to whether a transaction involving the emulation device using the data comprising each of the profiles was successful and analyzing the received indication to determine if a test contactless transaction device is approved.

In some embodiments, in the server computer as described above, the first method may further include the steps of: receiving update data comprising information corresponding to a new or revised profile; storing the update data at the server computer; and automatically transmitting the update data to the first apparatus.

Exemplary Computer Apparatuses

Figure 8:
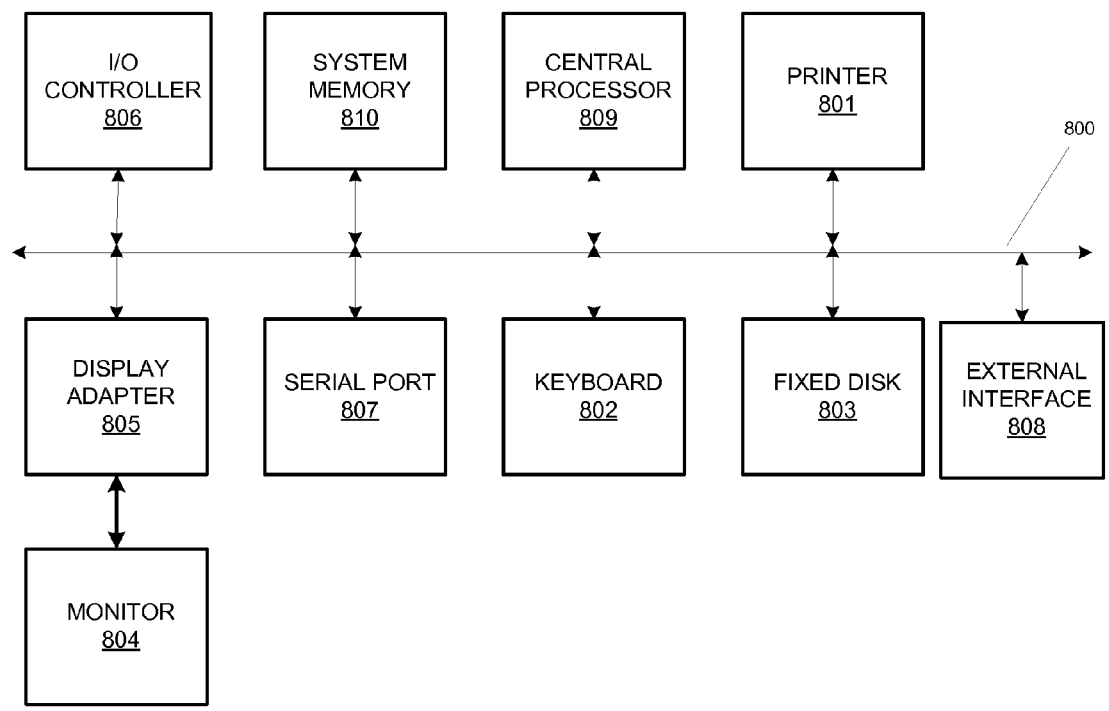
FIG. 8 shows a diagram of an exemplary computer system that may be used in embodiments.

Referring now to FIG. 8 the various devices and elements (e.g., the access device 102, the emulation device 104, the portable consumer device 106, and the server computer apparatus 112) in FIG. 1 can comprise one or more computer apparatuses (e.g., a server computer) to facilitate the functions described herein. Any of the elements in FIG. 1 can use any suitable number of subsystems to facilitate the functions described herein. Examples of such subsystems or components are shown in FIG. 8. The subsystems shown in FIG. 8 are interconnected via a system bus 800. Additional subsystems such as a printer 801, keyboard 802, fixed disk 803 (or other memory comprising computer readable media), monitor 804, which is coupled to display adapter 805, and others are shown. Peripherals and input/output (I/O) devices, which coupled to I/O controller 806, can be connected to the computer system by any number of means known in the art, such as serial port 807. For example, serial port 807 or external interface 808 can be used to connect the computer apparatus to a wide area network such as the Internet, a mouse input device, or a scanner. The interconnection via system bus allows the central processor 809 to communicate with each subsystem and to control the execution of instructions from system memory 810 or the fixed disk 803, as well as the exchange of information between subsystems. The system memory 810 and/or the fixed disk 803 can embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

CONCLUSION

It is understood that the various embodiments described herein are by way of example only, and are not intended to limit the scope of the invention. For example, many of the materials and structures described herein may be substituted with other materials and structures without deviating from the spirit of the invention. The present invention as claimed may therefore include variations from the particular examples and preferred embodiments described herein, as will be apparent to one of skill in the art. It is understood that various theories as to why the invention works are not intended to be limiting.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

Although many embodiments were described above as comprising different features and/or combination of features, a person of ordinary skill in the art after reading this disclosure may understand that in some instances, one or more of these components could be combined with any of the components or features described above. That is, one or more features from any embodiment can be combined with one or more features of any other embodiment without departing from the scope of the invention.

As noted previously, all measurements, dimensions, and materials provided herein within the specification or within the figures are by way of example only.

A recitation of "a," "an," or "the" is intended to mean "one or more" unless specifically indicated to the contrary. Reference to a "first" component does not necessarily require that a second component be provided. Moreover reference to a "first" or a "second" component does not limit the referenced component to a particular location unless expressly stated.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

What is claimed is:

1. A first apparatus comprising:
a processor; and
a storage medium coupled to the processor, comprising code executable by the processor for performing a first method including the steps of:
 receiving, by the first apparatus, data comprising a plurality of profiles, each of the plurality of profiles associated with a distinct contactless transaction device of a plurality of contactless transaction devices;
 communicating, by the first apparatus, using short range wireless communication, with a test contactless transaction device distinct from the first apparatus; and
 emulating, by the first apparatus, each of the contactless transaction devices associated with each of the profiles in distinct simulated transactions with the test contactless transaction device, the emulation of the contactless transaction device being based at least in part on the corresponding profile.

2. The first apparatus of claim 1, wherein the contactless transaction is a financial transaction.

3. The first apparatus of claim 1, wherein the first method further comprises the steps of:
receiving an indication for each simulation as to whether the simulated transaction was successful; and
transmitting the received indication related to the transaction to a server computer.

4. The first apparatus of claim 3, wherein the indication further comprises information related to an error for a simulated transaction that fails.

5. The first apparatus of claim 1,
wherein the plurality of profiles comprises contactless user device profiles; and
wherein the test contactless transaction device comprises a contactless acceptance device.

6. The first apparatus of claim 5, wherein the contactless user device profiles comprise portable consumer device profiles, and wherein the contactless acceptance device comprises an access device.

7. The first apparatus of claim 6, wherein the access device comprises any one of:
a proximity coupling device reader;
a proximity coupling device integrated; and
a proximity coupling device with application.

8. The first apparatus of claim 7, wherein the access device comprises a proximity coupling device reader coupled to any one of, or some combination of a terminal, a POS device, an EPOS device, an ATM, a personal computer, and a mobile phone.

9. The first apparatus of claim 1, wherein the plurality of profiles comprises contactless acceptance device profiles, and wherein the test contactless transaction device comprises a contactless user device.

10. The first apparatus of claim 9, wherein the contactless acceptance device profiles comprise access device profiles, and wherein the contactless user device comprises a portable consumer device.

11. The first apparatus of claim 1, wherein communicating using short range wireless communication comprises any one of, or some combination of:
radio frequency identification (RFID);
Bluetooth™; or
infra-red.

12. The first apparatus of claim 1, wherein the apparatus comprises a handheld portable device.

13. The first apparatus of claim 1, wherein each of the profiles comprises any one of, or some combination of:
verification capability;
a data authentication capability;
variable transaction specific data or parameters;
encryption logic; and
authorization capability.

14. The first apparatus of claim 1, wherein two or more of the plurality of profiles reconfigure the first apparatus to conduct different types of transactions with the test contactless transaction device.

15. The first apparatus of claim 1, wherein two or more of the plurality of profiles reconfigure the first apparatus to conduct transactions with different transaction protocols.

16. The first apparatus of claim 1, wherein two or more of the plurality of profiles reconfigure the first apparatus to conduct transactions with different encryption algorithms.

17. The first apparatus of claim 1, wherein two or more of the plurality of profiles reconfigure the first apparatus to conduct transactions with different types of contactless communication.

18. A method comprising:
receiving, at a computer apparatus, data comprising a plurality of profiles, each of the plurality of profiles associated with a distinct contactless transaction device of a plurality of contactless transaction devices;
communicating, by the computer apparatus using short range wireless communication, with a test contactless transaction device distinct from the computer apparatus;
emulating, by the computer apparatus, each of the contactless transaction devices associated with each of the profiles in distinct simulated transactions with the test contactless transaction device, the emulation of the contactless transaction device being based at least in part on the corresponding profile; and
storing, at the computer apparatus, data indicating whether each simulated transaction was successful.

19. A server computer comprising:
a processor; and
a storage medium coupled to the processor, comprising code executable by the processor for performing a method including the steps of:
transmitting, to a first apparatus, data comprising a plurality of profiles, wherein each of the plurality of profiles is associated with a distinct contactless transaction device of a plurality of contactless transaction devices;
receiving at least one indication as to whether a plurality of simulated transactions involving the first apparatus using the data comprising each of the profiles was successful, the first apparatus being configured at least to emulate the plurality of contactless transaction devices based at least in part on the transmitted profiles;
analyzing the received at least one indication; and
determining if a financial transaction device under test is approved based at least in part on the analysis of the at least one indication received from the first apparatus, the financial transaction device under test being distinct from the first apparatus.

20. The server computer of claim 19, where in method further includes the steps of:
receiving update data comprising information corresponding to a new or revised profile;
storing the update data at the server computer; and
automatically transmitting the update data to the first apparatus.

* * * * *